United States Patent [19]
Taki et al.

[11] Patent Number: 6,040,545
[45] Date of Patent: Mar. 21, 2000

[54] TIG WELDING METHOD AND WELDING APPARATUS

[75] Inventors: Keishi Taki, Yokohama; Yutaka Yanagi, Ichikawa, both of Japan

[73] Assignee: Kabushiki Kaisha Toshiba, Kawasaki, Japan

[21] Appl. No.: 09/093,717

[22] Filed: Jun. 9, 1998

[30] Foreign Application Priority Data

Jun. 10, 1997 [JP] Japan ................................. P.9-152716
May 26, 1998 [JP] Japan ................................ P.10-144882

[51] Int. Cl.⁷ .................................................... B23K 9/167
[52] U.S. Cl. .......................................... 219/75; 219/137 R
[58] Field of Search ........................ 219/75, 125, 125.11, 219/125.12, 136, 137 PS, 137 R, 74, 76.15

[56] References Cited

U.S. PATENT DOCUMENTS

| | | | |
|---|---|---|---|
| 2,922,024 | 1/1960 | Cresswell | 219/75 |
| 3,274,371 | 9/1966 | Manz et al. | 219/76.15 |
| 3,692,973 | 9/1972 | Oku et al. | 219/75 |
| 3,924,092 | 12/1975 | Lessmann et al. | 219/76.15 |
| 4,649,250 | 3/1987 | Kazlauskas | 219/125.11 |
| 5,149,939 | 9/1992 | Imaizumi et al. | 219/125.12 |
| 5,714,735 | 2/1998 | Offer | 219/75 |

FOREIGN PATENT DOCUMENTS 62-207583  9/1987  Japan ........................................ 219/75
62-263868  11/1987  Japan ................................. 219/137 PS

*Primary Examiner*—Clifford C. Shaw
*Attorney, Agent, or Firm*—Oblon, Spivak, McClelland, Maier & Neustadt, P.C.

[57] ABSTRACT

A TIG welding apparatus comprises a welding current supply means for supplying an electric current, a shield gas supply means for supplying shield gases, a tungsten electrode connected to the welding current supply means, a welding torch disposed coaxially around the tungsten electrode and provided with inner and outer double gas shields having gas jetting nozzles through which the gases are jetted, a plurality of wires to be fed to a portion at which the gases are jetted through the gas jetting nozzles, a wire feeding means, and a heating means connected to the wires, except at least one wire, for heating the wires. A TIG welding method is carried out by using such welding apparatus through the steps of supplying shield gases into the inner and outer gas shields and jetting the shield gases through the jetting nozzles to a portion at which a welding arc is generated, feeding continuously wires, except at least one wire, under a condition heated by the heating means to that portion as hot wires through the wire feeding means and feeding continuously the at least one wire under a condition not heated to the portion as cold wire through the wire feeding means substantially at the same time of the feeding of the hot wires.

9 Claims, 4 Drawing Sheets

TIG WELDING METHOD AND WELDING APPARATUS

BACKGROUND OF THE INVENTION

The present invention relates to a TIG welding method and apparatus suitable for welding a building or structure having a large size such as power plant, particularly, for carrying out an entire welding attitude including vertical and upward welding attitudes of an welding apparatus in a stable manner with high fusing efficiency.

The TIG welding method has been widely utilized, as a well known welding method, for various welding workings requiring high quality of a welded portion because, by the TIG welding, a portion to be welded is shut off from an environment air by a shield gas jetted around an electrode to thereby prevent oxidation and nitriding of that portion. However, since, in such TIG welding method since a non-fusible tungsten electrode is used, the welding efficiency is not good in comparison with an MIG welding method or other method using a fusible electrode. Moreover, in an occasion that a feeding speed of a wire to be fed as a filler material is excessively increased over a limit of welding penetration depth of the wire, there may be caused a case where a portion of the wire which has not been completely melted abuts against a bottom portion (portion not to be welded or solid portion such as previously welded bead) of a molten pool, which will result in an instable welded condition.

In a known art, various efforts have been made for solving the problems mentioned above. For example, there is provided a double-gas-shield method in which inner and outer double gas shields are formed around the tungsten electrode to enhance a thermal pinch effect and hence to create an arc throttled state and increase the welding penetration depth. Examples of TIG welding methods utilizing such double-gas-shield technique are disclosed in Japanese Patent Laid-open Publication No. HEI 6-71446 in which it is attempted to make constant the welding penetration depth through controlling of a gas supply amount and in Japanese Patent Laid-open Publication No. HEI 7-227673 in which it is attempted to increase operational efficiency through an improvement of gas supply density.

In another aspect, further attempts have been made from the view point of a wire to be applied. For example, there has been proposed a method in which a plurality of wires are simultaneously fed to perform deep welding penetration under high voltage or a method in which the welding wire is heated through current conduction to facilitate the fusing of the wire and hence to increase the welding penetration. However, as mentioned, in these prior art methods, the attempts have been carried out only in a view point of increasing the wire welding penetration, and these methods have been carried out separately.

In order to connect or join a large structure such as construction of a large building such as power plant and/or to connect or join a structure having a large thickness such as duct jointing, it is required for the application of the TIG welding to improve welding stability with no welding defect, welding speed, fusing speed of the wire or the like. However, in the welding working site of the construction of the power plant, for example, it is needed to carry out the welding in an entire directional welding attitude or position of a welding apparatus such as normal downward welding attitude, standing vertical welding attitude welding or upward welding attitude. However, in the standing attitude welding or upward attitude welding of the welding apparatus, the surface of the molten pool in the TIG welding is directed horizontally or downward, and accordingly, there may occur a case that a balance of force acting to the molten pool cannot be kept correctly and the molten pool may drop down even in the method of increasing the welding penetration amount of the welding wire in the prior art as mentioned above. Therefore, in the case where the entire attitude welding working of the welding apparatus is required, it is difficult to apply the conventional welding technologies as they are, and as a result in the conventional usual TIG welding method, the welding is performed with a fusing speed of only 10 to 20 g/min for the welding of steel material. That is, in the conventional TIG welding method, although a welded portion with high quality could be obtained, the fusing efficiency was considerably low, so that the application of such TIG welding had a limit in the practical use for the welding of large structures or structures having a large thickness.

SUMMARY OF THE INVENTION

An object of the present invention is to substantially eliminate defects or drawbacks encountered in the prior art mentioned above and to provide a TIG welding method and apparatus capable of remarkably improving the fusing efficiency with improved stability being maintained even in the vertically standing attitude welding or upward welding attitude of the welding apparatus with an improved operational efficiency in the practical application thereof.

This and other objects can be achieved in consideration of the inventors of the subject application about the following points.

That is, in the conventional welding method, it has been mainly intended to increase the size of the molten pool through the feeding of a plurality of wires or the heating of the wire. However, in such conventional method, it was impossible to sufficiently deal with the problems of drop-down of molten material at the time of vertical or upward attitude welding of the welding apparatus in which the molten pool cannot be kept in its balanced condition. Such defect will be prevented from causing if the molten pool could be rapidly cooled to increase the surface tension thereof. This will be achieved by utilizing a latent heat of the wire itself or in combination of the improvement of the fusing capacity in the double shield TIG welding.

The present invention was conceived basically in consideration of these matters.

According to the present invention, in one aspect there is provided a TIG welding method in which inner and outer double gas shields are formed coaxially around a tungsten electrode to generate an arc and a plurality of wires as filler material are continuously fed to the arc generating portion to perform a TIG welding operation, wherein at least one of the wires is fed under a heated condition as a heated hot wire and at least one of other wires is fed under a non-heated condition as a cold wire for cooling a molten pool.

In a preferred example, the hot wire is composed of a solid wire and the cold wire is composed of a twisted filament wire. When a U-shaped groove welding is carried out with a full welding penetration of the wire, a ratio L/h of a length L of a root parallel portion of a material to be welded and a root face thickness h of the material is set to a value more than 2.4 and less than 5.3 in which the length L is set to a value more than 6 mm and less than 8 mm and a groove angle is set to a value more than 20 and less than 8°.

The TIG welding method is applied to an entire attitude welding, including vertical attitude welding and upward attitude welding, of a TIG welding apparatus.

According to the above aspect of the present invention, the wires to be fed are classified into hot wire and cold wire, in which the hot wire is fed under the heated condition and the cold wire is fed under the non-heated condition. Accordingly, the hot wire is increased in its fusing speed by the thermal pinch effect and the heating process through the double shield gas supplying, and hence, the molten pool tends to be increased in its size. However, according to the present invention, the cold wire is simultaneously fed to cool the molten pool to thereby prevent it from increasing in size. Therefore, the dimension or size of the molten pool can be kept properly even if the fusing speed of the hot wire is increased. According to such control of the molten pool size, the molten pool size can be also kept properly small even in the vertical or upward attitude welding operation of the welding apparatus without drop-down of the molten pool with the high fusing speed being kept. Thus, the stable welding operation can be realized with no welding defect with the stable high fusing speed.

The twisted filament wire as the cold wire has a large surface area, so that the melting performance is increased, facilitating the cooling effect of the molten pool. The twisted wire has a linearly advancing property, so that it can be surely inserted into the molten pool. The use of the solid wire as the hot wire is for increasing the current density for the current conduction heating in comparison with the twisted wire.

Further, concerning the setting of the ratio L/h, the root parallel length L, the root face thickness h and the groove angle to the values mentioned above, the followings are to be noted. The root parallel portion means portions to be butt welded of a pair of materials to be welded for forming a U-shaped groove, and in the case of Ithe long length L, the width of the groove increases, which requires much padding at the time of the initial (first) welded layer formation and increased numbers of the welding paths of the welding apparatus. On the contrary, in the case of short length L, the width of the groove is reduced, which results in insufficient formation of the molten pool, and in an adverse case, a recessed portion may be formed to the rear surface side of the groove, providing an instable welding condition. In the case of the large root face thickness h, it is difficult to obtain a stable melt condition and the rear surface side of the groove may provide a suspended state, and on the contrary, in the case of the small thickness h, the rear surface side thereof may be melt down. However, these drawbacks or defects can be improved by setting the above values to those of the present invention mentioned above in the case where the heat input at the welding for forming the first layer is set to 2250 to 2700 J/cm. The U-shaped groove welding is effected for the purpose of achieving the effective welding with reduced number of welding paths of the welding apparatus, and in the case of the large groove angle, the path number is increased in the formation of the upper welded layers and in the case of the small groove angle, welding defect is liable to cause at corner portions in the respective welding paths of the welding apparatus. Such problems can be solved by the groove angle of the present invention mentioned above.

In the case of the vertical and upward welding attitude of the welding apparatus, according to the present invention, the stable and sufficient welding condition can be realized with the proper molten pool condition being kept and with no drop-down of the molten material.

In another aspect of the present invention, there is provided a TIG welding apparatus comprising:

a welding current supply means for supplying an electric current for carrying out a welding operation;

a shield gas supply means for supplying two types of gasses;

a tungsten electrode connected to the welding current supply means;

a welding torch disposed coaxially around the tungsten electrode and provided with inner and outer double gas shields having gas jetting nozzles through which the gases are jetted;

a plurality of wires to be fed to a portion at which the gases are jetted through the gas jetting nozzles;

a wire feeding means for continuously feeding the wires to the portion at which an welding arc is generated by means of the jetted gases; and a heating means connected to the wires except at least one wire for heating the wires.

In a preferred example in this aspect, the at least one wire is composed of a cold wire under non-heated condition. The wires are two types of wires including one hot wire under the heated condition by the heating means and one cold wire under the non-heated condition. The hot wire is composed of a solid wire and the cold wire is composed of a twisted filament wire. The gas jetting nozzle of the outer gas shield has an inwardly tapered end portion so as to jet the shield gas in a converged fashion.

According to the welding apparatus of the structure mentioned above, substantially the same advantageous effects and functions as those mentioned above with reference to the TIG welding method of the present invention can be attained.

A more concrete aspect of the present invention, a TIG welding method is carried out by a welding apparatus comprising a welding current supply means for supplying an electric current, a shield gas supply means for supplying shield gases, a tungsten electrode connected to the welding current supply means, a welding torch disposed coaxially around the tungsten electrode and provided with inner and outer double gas shields having gas jetting nozzles through which the gases are jetted, a plurality of wires to be fed to a portion at which the gases are jetted through the gas jetting nozzles, a wire feeding means, and a heating means connected to the wires except at least one wire for heating the wires, and the TIG welding method comprises the steps of:

supplying shield gases into the inner and outer gas shields and jetting the shield gases through the jetting nozzles to a portion at which a welding arc is generated;

feeding continuously wires except at least one wire under a condition heated by the heating means to the portion as hot wires through the wire feeding means; and feeding continuously the at least one wire under a condition not hated to the portion as cold wire through the wire feeding means substantially at the same time of the feeding of the hot wires.

The nature and further characteristic features of the present invention will be made more clear from the following descriptions made with reference to the accompanying drawings.

DESCRIPTION OF THE PREFERRED EMBODIMENT

One preferred embodiment of the present invention will be described hereunder with reference to the accompanying drawings.

Figure 1:
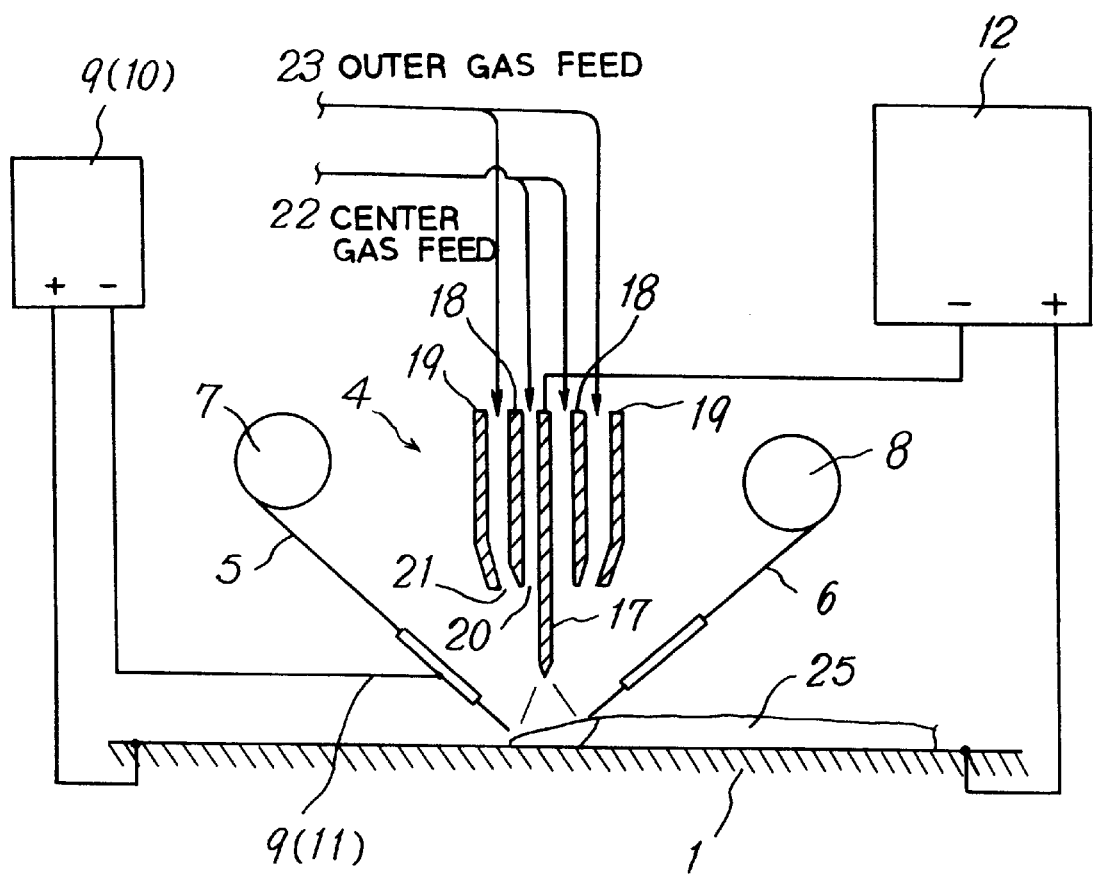
FIG. 1 is a diagramatic view showing a TIG welding method according to one embodiment of the present invention by using a TIG welding apparatus of the present invention.
Figure 2:
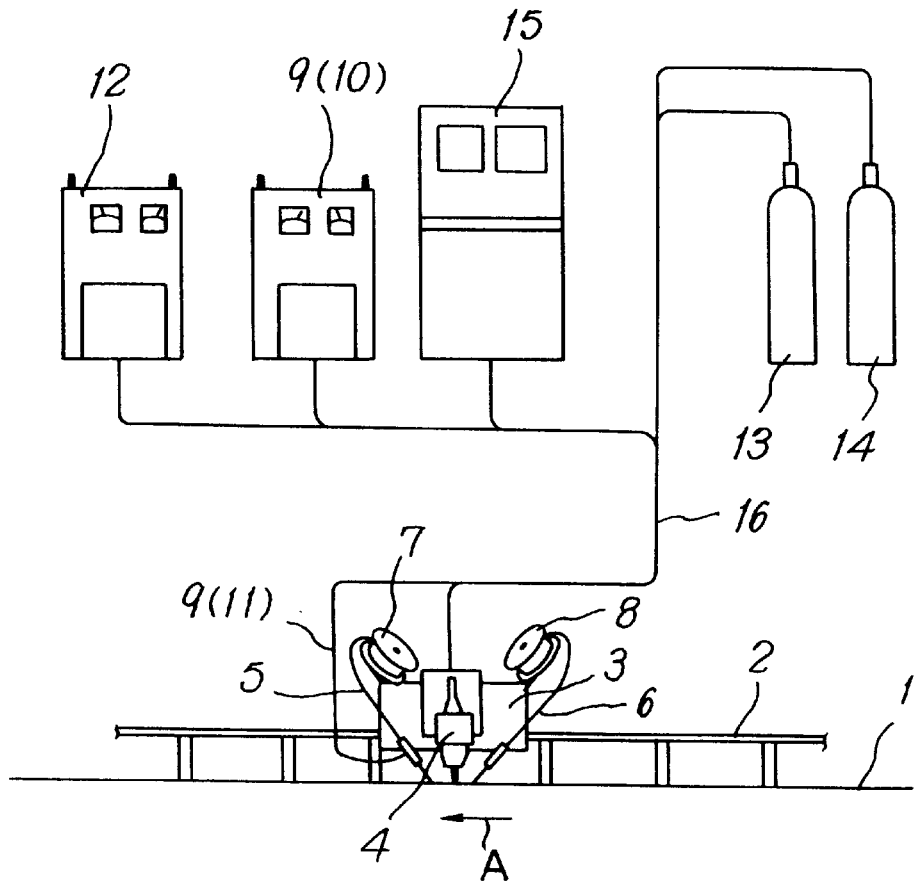
FIG. 2 is a schematic view showing an entire arrangement of the TIG welding apparatus of FIG. 1.

FIG. 1 shows an essential structure (welding torch) of the TIG welding apparatus of the present invention and FIG. 2 shows the entire structure thereof.

With reference to FIG. 2, the TIG welding apparatus of the present invention comprises a rail assembly 2 disposed along a welding root of a material to be welded and a travelling bogie or truck 3 mounted to be movable on the rail assembly 2 through wheels, not shown. A welding torch 4 having a double gas shield structure for the TIG welding is disposed on the travelling bogie 3. A pair of wire feeding devices 7 and 8 for feeding wires 5 and 6 as filler material are arranged at front and rear positions, bilateral positions as viewed in FIG. 2, of the welding torch 4 along the travelling direction A of the bogie 3 in a manner such that one of the wires 5 fed by the wire feeding device 7 disposed to the front position in the welding torch advancing direction is heated by a current conduction heating device 9, which is composed of a wire heating power source 10 and a connecting member 11. The welding apparatus further includes a power source 12 for welding for supplying welding current and a pair of gas bombs 13 and 14 for supplying shield gases for forming the double gas shield. A welding control device 15 is also provided for controlling the travelling of the travelling bogie 3, the operation of the welding torch 4, the feeding of the wires 5 and 6 and the operations of the welding power source 12 and the heating power source 10. These controllings, gas supplying and power supplying are performed by means of or by way of cable means including hoses, wirings, ducts or the like.

As shown in FIG. 1, the welding torch 4 is composed of a tungsten electrode 17 and inner and outer shield cups 18 and 19 which are coaxially arranged around the tungsten electrode 17. These inner and outer shield cups 18 and 19 constitute a double-gas-shield structure having front ends (lower ends as viewed) constituting gas jetting nozzles 20 and 21. The outer jig jetting nozzle has a inwardly tapered shape so as to converge the outer shield gas to be jetted.

A center gas 22, as an inner shield gas, such as argon gas, helium gas, hydrogen gas or mixture gas thereof is supplied inside the inner shield cup 18, in which the tungsten electrode 17 is centrally arranged, and an outer shield gas 23 such as argon gas or the like is supplied between the inner shield cup 18 and the outer shield cup 19. These gases 22 and 23 are supplied from the upper portion as viewed and then jetted outward from the gas jetting nozzles 20 and 21, respectively, so as to form a TIG arc 24. The jetted gasses are converged by obliquely inwardly supplying the outer shield gas 23.

Two wires 5 and 6 are inserted to the TIG arc portion 24. One of the wires 5 is a solid wire and is inserted by the wire feeding device 7 from the front portion of the welding torch 4. The wire 5 is heated by the wire heating device 9 as a hot wire. The other one of the wires 6 is a twisted wire and is inserted by the wire feeding device 8 from the rear portion of the welding torch 4. This wire 6 is a cold wire not heated.

When the TIG welding process is carried out, the welding torch 4 is conveyed together with the travelling bogie 3 along the travelling direction A in FIG. 2, and the TIG welding is effected to the portion (member) 1 to be welded, through which a welded bead 25 is formed as shown in FIG. 1.

The TIG welding method of the present invention performed by using the welding apparatus of the structure mentioned above will be described hereunder with reference to a result of a test performed by the applicant.

Figure 3:
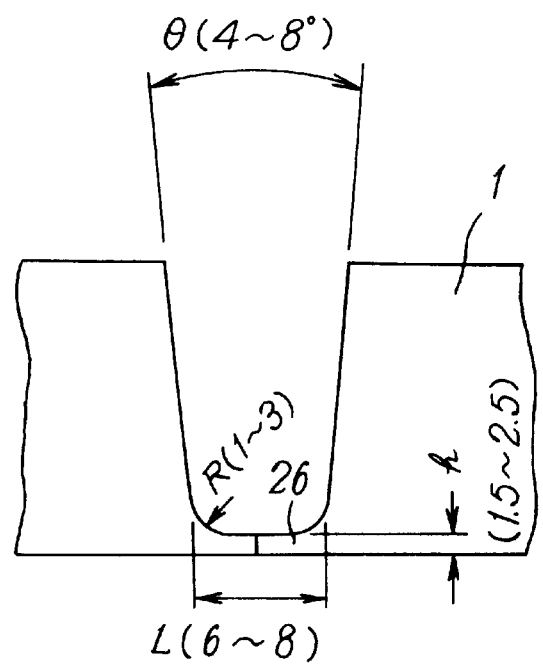
FIG. 3 is an illustration showing a welding groove shape in the above embodiment.
Figure 4:
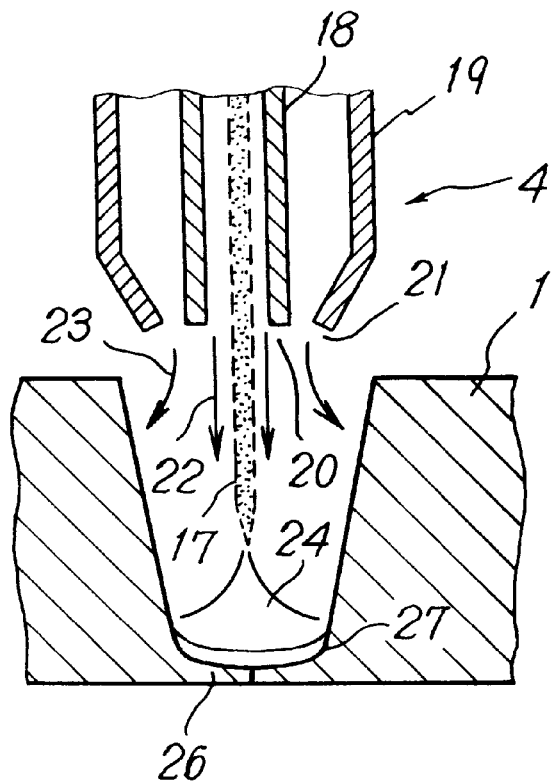
FIG. 4 is a view showing a welding condition in the above embodiment.
Figure 5:
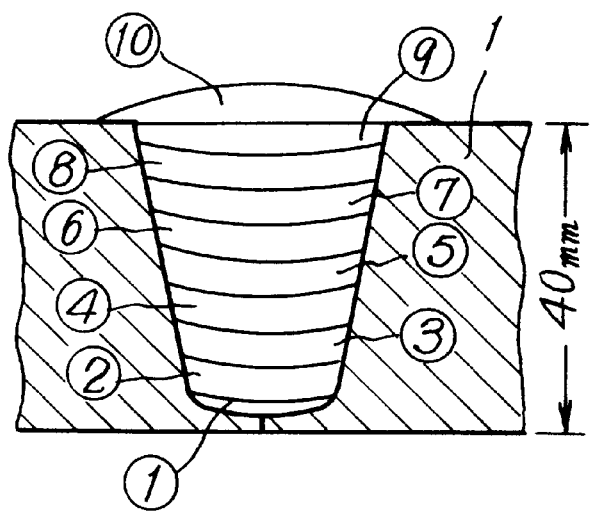
FIG. 5 is a view showing a welding path in the above embodiment.

FIG. 3 shows a groove shape of the used material 1 to be welded, FIG. 4 shows the condition of the welding arc 24 and the shield gases at the groove portion and FIG. 5 shows a welded condition through the welding paths of the welding apparatus from the initial welded layer to the final welded layer.

Although, in the test performed, the TIG welding was executed to various kinds of carbon steels and stainless steels, there is described hereunder a case wherein SUS 316 plate (plate thickness of 40 mm) was used as the material 1 to be welded, the wires 5 and 6 having the same substance as that of the material 1 were used (having a diameter of 0.9 to 1.2 mm), and the welding processes were performed through the vertically and upward directed attitudes of the welding apparatus for the butt-welding of the full welding penetration U-shaped groove through the substantially entire surfaces of portions of materials to be welded.

In this case, the groove shown in FIG. 3 was set such that a root parallel portion 26 of the material to be welded has a length L of more than 6 mm and less than 8 mm and a root face has a thickness h of more than 1.5 mm and less than 2.5 mm, that is, a ratio of L/h was more than 2.4 and less than 5.3. The groove angle (bevel angle) θ was set to more than 2° and less than 8°, and an inner radius R of the root parallel portion 26 was set to more than lm and less than 3 mm.

Then, as shown in FIG. 4, the tungsten electrode 17 of the welding torch 4 is inserted to a bottom portion of the groove so that the gas jetting nozzles 20 and 21 of the inner and outer shield cups 18 and 19 are positioned at the opened portion of the groove. Under the condition, the TIG welding was performed. The welding condition was observed during the welding process. In the observation, the converged TIG arc 24 was formed by flowing the center gas 22 such as argon, helium or hydrogen gas, or mixture gas thereof inside the inner shield cup 18 and a high heat input condition was created by the converged arc 24. The heat input amount was 2250 to 2700 J/cm.

The hot wire 5 fed from one of the wire feeding devices 7 was fused by this high heat input with high fusing coefficiency and a stable molten pool 27 was formed. On the other hand, by feeding the other cold wire 6 from the other wire feeding device 8, the molten pool 27 was cooled, and accordingly, in the case of the upward or vertical welding attitude of the welding apparatus, the molten material did not drop down.

According to the processes mentioned above, ten welded layers from the initial welded layer ① to the final welded layer ⑩ shown in FIG. 5 were formed through one path for each layer of the welding apparatus along the portion of the material to be welded.

As the result of such welding processes, when the downward attitude welding was performed, a high fusing efficiency of the welding speed of 150 to 350 mm and the fusing speed of about 60 g/min were obtained with the welding current (average current) of 390 to 400 A (ampere).

Further, when the vertical and upward attitude welding were performed, a high fusing efficiency of the welding speed of 60 to 160 mm and the fusing speed of about 40 g/min were obtained with the welding current (average current) of 260 to 300 A (ampere).

For the sake of comparison, an identical test was carried out by a conventional TIG welding method using only one wire. As a result of such test, only a low fusing speed of 10 to 15 g/min was obtained in each of the downward, vertical and upward attitude weldings of the welding apparatus, thus providing a low fusing efficiency through the conventional TIG welding method. That is, according to the described embodiment of the present invention, the fusing speed more than two times of that obtained by the conventional method could be achieved, and hence, the fusing efficiency could be remarkably improved.

Figure 6:
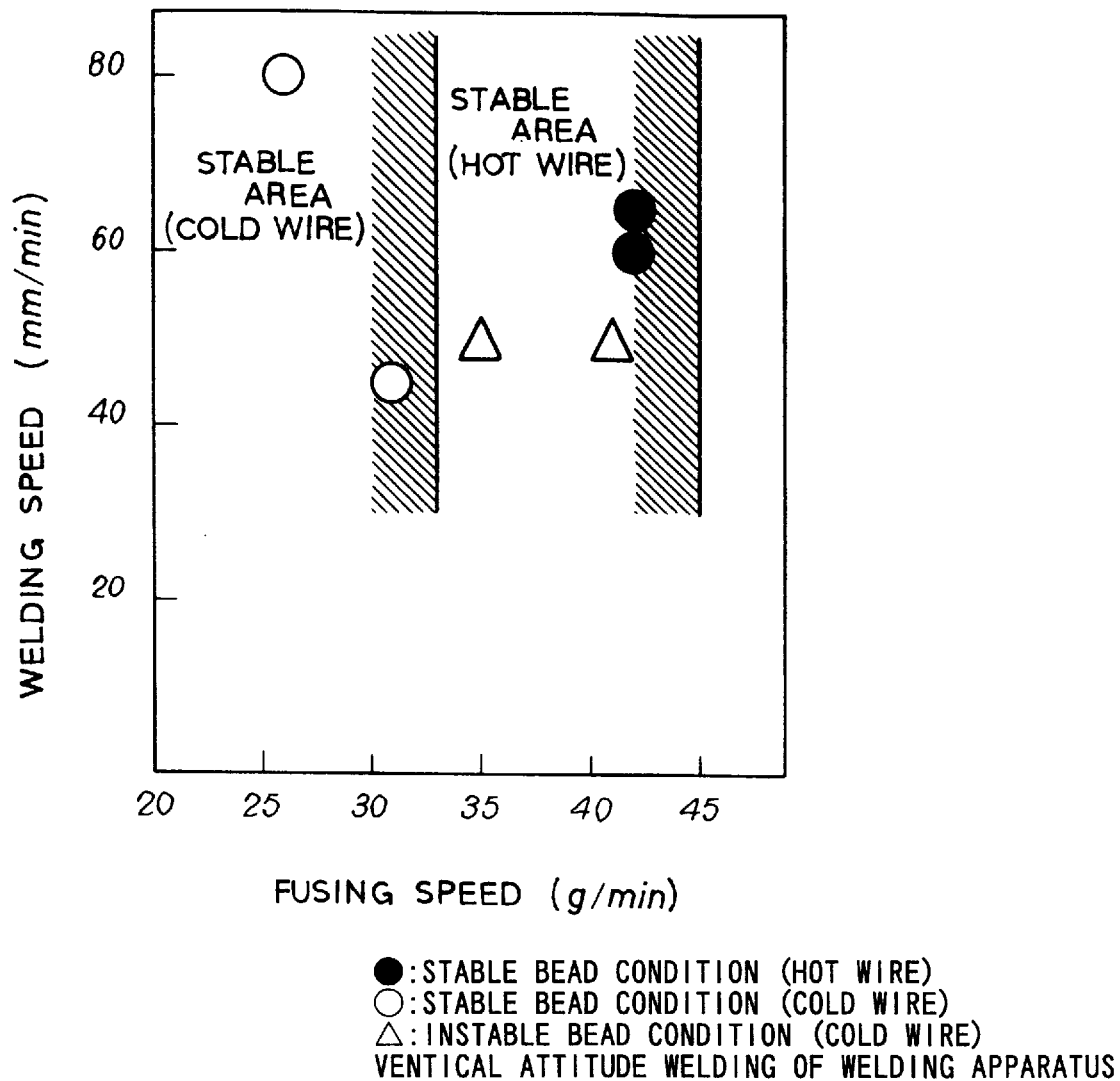
FIG. 6 is a graph showing a relationship between welding speed and fusing speed as a test result of the above embodiment.

FIG. 6 is a graph evidencing the characteristic features of the present invention, as a test result, representing the relationship between the welding speed and the fusing speed in a case where the hot wire 5 and the cold wire 6 was solely used. This test was carried out through the vertical attitude welding of the welding apparatus.

With reference to FIG. 6, in the case of the TIG welding using only the hot wire 5, a welding condition having stable quality with no welding defect appeared in the area of welding speed of about 60 mm/min and fusing speed of more than 40 mm/min as shown with ●. According to this fact, it will be found that when only the hot wire 5 is used, the stable welding area resides in the high welding speed and high fusing speed area. On the other hand, in the case of the TIG welding using only the cold wire 6, a welding condition having stable quality appeared in the area of welding speed of 40 to 80 mm/min and fusing speed of 25 to 30 mm/min as shown with ○. According to this fact, it will be found that when only the cold wire 6 is used, the stable welding area resides in the high welding speed and high fusing speed area. Furthermore, in a further test in which only the cold wire 6 was used with the increased fusing speed of 25 to 40 mm/min, welded portions become defective in quality as shown with Δ.

According to the test results shown in FIG. 6, it will be evidenced that the following improved welding functions and effects can be achieved according to the present invention.

That is, according to the double gas shield TIG welding, the arc 24 is converged due to the thermal pinch effect by increasing the flow velocity of the center gas 22, and hence, the welding heat input having high energy density can be obtained. As a result, the welding penetration depth becomes large in comparison with that obtained by the conventional TIG welding carried out with the same arc current. In the conventional TIG welding, because of the limit of the welding penetration depth, as the wire feeding speed is increased, an inserted front end portion of the wire, which has not been completely fused, abuts against the bottom portion (solid portion) of the molten pool, thus providing an instable welded condition.

On the contrary, according to the double gas shield TIG welding, the welding penetration depth can be made large, so that the stable welded condition can be created even if the wire is fed at an increased wire feeding speed. However, in the case of the high welding penetration being achieved by the double shield TIG welding, there is a limit to the wire feeding speed. According to the present invention, the wire 5 is heated by the current conduction as the hot wire to thereby increase the fusing speed of the wire 5 itself, and therefore, it becomes possible to further increase the wire feeding speed.

Further, when it is intended to improve the fusing speed by the current conduction heating in the double gas shield TIG welding process, there will be raised a problem of the welding attitudes of the welding apparatus. That is, in the case of the downward attitude of the welding apparatus, the stable welding condition can be achieved even in the increased molten pool formed by the improved fusing speed. However, in the case of the vertical or upward attitude welding of the welding apparatus, when the fusing speed is increased, there may cause a case where a good force balance acting to the molten pool is not kept and the stable welding condition cannot be achieved.

On the contrary, according to the present invention, the hot wire 5 and the cold wire 6 are fed, the molten pool 27, which tends to be increased by the current conduction heating to the hot wire 5, is cooled and hence reduced by the insertion of the cold wire 6. Therefore, the dimension or size of the molten pool 27 can be made small even in the increased fusing speed in comparison with the case of only the hot wire 5 being inserted.

As mentioned above and evidenced through the test experiments, in the present invention, the double gas shield TIG welding process is carried out by feeding and inserting the hot wire 5 together with the cold wire 6. According to such present invention, the molten pool can be kept in its size even in the increased fusing speed in the entire welding attitude of the welding apparatus including the vertical and upward welding attitudes, thereby preventing the molten material from dropping down and hence achieving the stable welding condition with high fusing efficiency.

Furthermore, since the cold wire 6 is composed of twisted filament wire, the entire surface area thereof can be increased in the case of using the solid wire, improving the melting efficiency. Moreover, the twisted wire has a superior linearly advancing property, so that the cold wire can be more stably fed and inserted and the welding result with the stable high fusing efficiency can be hence realized.

Still furthermore, in the U-shaped groove welding through the full penetration operation, the ratio L/h (length L of the parallel root portion 26/root face thickness h) is set to a value more than 2.4 and less than 5.3, the length of the root parallel portion is set to more than 6 mm and less than 8 mm, and the bevel angle (groove angle) is set to less than 8°, so that the stable welding penetration and stable bead shape can be obtained with the heat input amount of 2250 to 2700 J/cm.

It is to be noted that the present invention is not limited to the described embodiment and many other changes and modifications may be made without departing from the scopes of the appended claims.

For example, in the described embodiment, the case in which only one hot wire 5 and one cold wire 6 are used as a preferred example, a plurality of hot wires 5 and cold wires 6 may be used as occasion demands.

What is claimed is:

1. A TIG welding method in which inner and outer double gas shields are formed coaxially around a tungsten electrode to generate an arc and a plurality of wires as filler material are continuously fed to the arc generating portion to perform a TIG welding operation, wherein at least one of the wires is fed under a heated condition as a hot wire and at least one of other wires is fed under a non-heated condition as a cold wire for cooling a molten pool.

2. A TIG welding method according to claim 1, wherein the hot wire is composed of a solid wire and the cold wire is composed of a twisted filament wire.

3. A TIG welding method according to claim 1, wherein a material to be welded is formed with a U shaped groove having a ratio L/h of a length L of a root parallel portion of the material to be welded and a root face thickness h of the material, is set to a value more than 2.4 and less than 5.3 and wherein the length L is set to a value more than 6 mm and less than 8 mm and a groove angle is set to a value more than 2° and less than 8°.

4. A TIG welding method according to claim 1, wherein the TIG welding method is applied in all directional positions of a TIG welding apparatus including normal downward welding, standing vertical welding, and upward welding.

5. A TIG welding apparatus comprising:
- a welding current supply means for supplying an electric current for carrying out a welding;
- a shield gas supply means for supplying two types of gasses;
- a tungsten electrode connected to the welding current supply means;
- a welding torch disposed coaxially around the tungsten electrode and provided with inner and outer gas shields each having a gas jetting nozzle through which a respective one of said two types of gases is jetted;
- a plurality of wires to be fed to a portion at which the gases are jetted through the gas jetting nozzles, said plurality of wires including at least one cold wire;
- a wire feeding means for continuously feeding the plurality of wires to the portion at which a welding arc is generated by means of the jetted gases; and
- a heating means connected to said plurality of wires other than said at least one cold wire, for heating said plurality of wires connected to said heating means.

6. A TIG welding apparatus according to claim 5, wherein said wires are two wires including one hot wire under the heated condition by the heating means and one cold wire under the non-heated condition.

7. A TIG welding apparatus according to claim 6, wherein said hot wire is composed of a solid wire and said cold wire is composed of a twisted filament wire.

8. A TIG welding apparatus according to claim 5, wherein said gas jetting nozzle of the outer gas shield has an inwardly tapered end portion so as to jet the shield gas in a converged fashion.

9. A TIG welding method which is carried out by a welding apparatus comprising a welding current supply means for supplying an electric current, a shield gas supply means for supplying shield gases, a tungsten electrode connected to the welding current supply means, a welding torch disposed coaxially around the tungsten electrode and provided with inner and outer double gas shields having gas jetting nozzles through which the gases are jetted, a plurality of wires to be fed to a portion at which the gases are jetted through the gas jetting nozzles, a wire feeding means, and a heating means connected to the wires, except at least one wire, for heating the wires, said TIG welding method comprising the steps of:
- supplying shield gases into the inner and outer gas shields and jetting the shield gases through the jetting nozzles to a portion at which a welding arc is generated;
- feeding continuously wires, except at least one wire, under a condition heated by the heating means to said portion as hot wires through the wire feeding means; and
- feeding continuously said at least one wire under a condition not heated to said portion as cold wire through the wire feeding means substantially at the same time of the feeding of the hot wires.

* * * * *